United States Patent [19]

Miller

[11] Patent Number: 4,923,241
[45] Date of Patent: May 8, 1990

[54] WEATHER WINDOW SHIELD FOR AUTOMOTIVE VEHICLES AND THE LIKE

[76] Inventor: Evelyn B. Miller, P.O. Box 204, Bluff City, Tenn. 37618

[21] Appl. No.: 300,310

[22] Filed: Jan. 23, 1989

[51] Int. Cl.$^5$ ................................................ B60J 1/20
[52] U.S. Cl. ...................................... 296/154; 98/2.13
[58] Field of Search ................ 296/152, 154; 98/2.12, 98/2.13, 87, 88.1; 49/502, 476, 71, 408, 471; 52/64, 74; 53/587

[56] References Cited

U.S. PATENT DOCUMENTS

| | | | |
|---|---|---|---|
| 3,866,524 | 2/1975 | Forbes, Jr. | 98/2.13 X |
| 4,527,466 | 7/1985 | Kossor et al. | 296/152 X |
| 4,558,633 | 12/1985 | Lingg | 296/152 X |
| 4,685,718 | 8/1987 | Steenblik et al. | 98/2.12 X |

FOREIGN PATENT DOCUMENTS

| | | | |
|---|---|---|---|
| 0156551 | 1/1953 | Australia | 296/154 |
| 0164758 | 9/1953 | Australia | 296/154 |
| 2645960 | 10/1976 | Fed. Rep. of Germany | 296/152 |
| 1573395 | 7/1969 | France | 296/152 |
| 0871556 | 6/1961 | United Kingdom | 296/154 |
| 0918689 | 2/1963 | United Kingdom | 296/152 |

*Primary Examiner*—Dennis H. Pedder
*Assistant Examiner*—Obele Acha-Ngwodo
*Attorney, Agent, or Firm*—Richard L. Miller

[57] ABSTRACT

An optically transparent weather window shield is designed for automotive vehicles and the like to protect an occupant from wind, rain, and snow when the window opening it is received in has the glass down. Primarily, it consists of a main body with a rain run-off channel and a downwardly angled front portion for wind and rain deflection. A mounting member is secured to a side edge of the main body and the front portion, and an edge portion of the mounting member is force fitted into the window receiving channel of the vehicle mounting the shield. The structure is also such, that it is installed without any fasteners and is easily removed when desired. The device is transparent so as not to interfere with the vision of the driver while operating the vehicle.

2 Claims, 1 Drawing Sheet

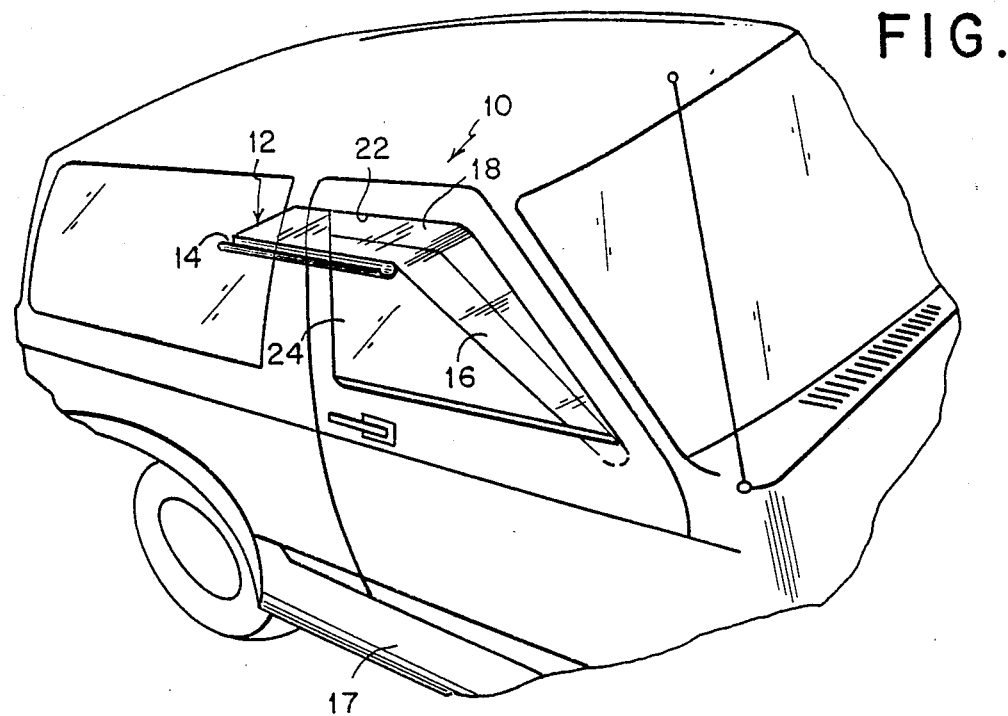
FIG. 1
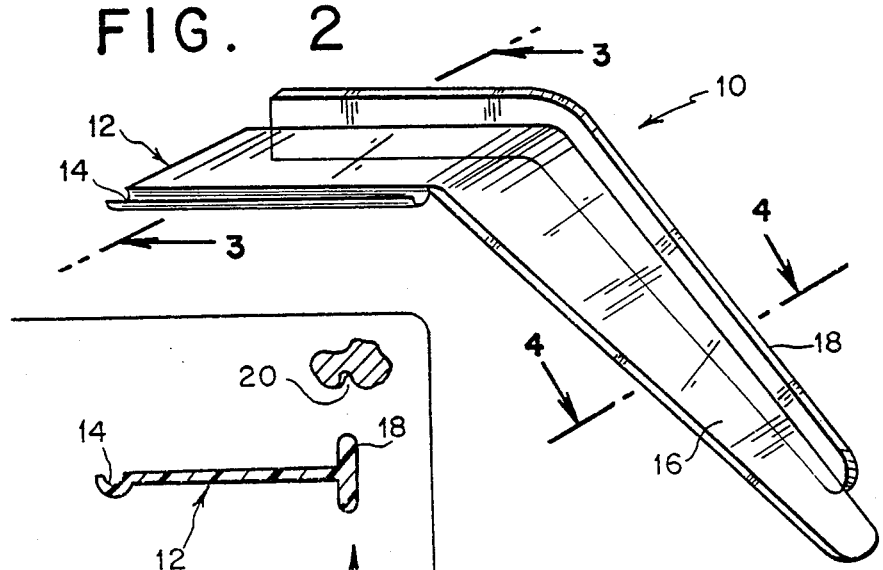
FIG. 2
FIG. 3
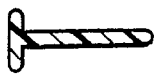
FIG. 4

WEATHER WINDOW SHIELD FOR AUTOMOTIVE VEHICLES AND THE LIKE

BACKGROUND OF THE INVENTION

The instant invention relates generally to automotive vehicle windows, and more particularly, to a weather window shield for automotive vehicles and the like.

Numerous devices have been provided in the prior art that are adapted for auxiliary protection of automotive vehicle operators. For example, U.S. Pat. Nos. 4,685,718 of Steenblik et al, 2,583,759 of Williams et al, and 2,506,383 of Powers, all are illustrative of such prior art. While these units may be suitable for the particular purpose to which they address, they would not be as suitable for the purpose of the present invention as hereafter described.

SUMMARY OF THE INVENTION

A primary object of the present invention is to provide a weather window shield for automotive vehicles and the like that will overcome the shortcomings of the prior art devices.

Another object is to provide a weather window shield for automotive vehicles and the like that will be of such design, as to be employed to keep weather precipitation and cold air drafts out of a vehicle when its window is in the down position.

An additional object is to provide a weather window shield for automotive vehicles and the like that will be so designed, as to enable the window to be raised while the shield is in place, and yet the structure requires no fasteners to mount it.

A further object is to provide a weather window shield for automotive vehicles and the like that is simple and easy to use.

A still further object is to provide a weather window shield for automotive vehicles and the like that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the instant invention mounted on an automobile;

FIG. 2 is a perspective view of the instant invention per se;

FIG. 3 is a cross sectional view taken on line 3—3 of FIG. 2; and

FIG. 4 is a cross sectional view taken on line 4—4 of FIG. 2.

DETAILED DESCRIPTION OF THE PREFERRED EMBODIMENTS

Turning now descriptively to the drawings, in which like reference characters denote like elements throughout the several views, a weather shield 10 is shown to include a main body 12 having a rain channel 14 integrally attached to one outer side edge. A tapered and angularly disposed forward portion 16 is provided and also integrally attached to main body 12 for deflecting rain, snow, and wind, when the vehicle 17 is in forward motion. Another inner side edge of main body 12 and an inner side edge of forward portion 16, are integrally attached to a central portion of a face of a flange-like mounting member 18.

It shall be noted that shield 10 is fabricated preferably of a sheet-form tinted clear plastic material, and the forward ends of mounting member 18 and forward portion 16, are rounded to facilitate easy entrance of an upper free edge portion of the mounting member into window channel 20 of window opening 22 when the window 24 is in its lower most position.

After the shield 10 is installed window 24 may still be raised and lowered in the normal matter however the top edge of the window will abut against a lower free edge portion of the mounting member 18 instead of entering into window channel 20 when the window is in its now most closed position.

Shield 10 is designed to be a resilient device that is easily fitted into the window channel 20 at the upper and forward portions of the window opening 22, and shield 10 will remain in place without the employment of any additional fasteners. The shield 10 is further designed, so as to to enable the window 24 to engage with the lower free edge portion of the mounting member 18, as illustrated in FIG. 3.

It shall also be recognized that the forward portion 16 extends forwardly beyond the mounting member and may be curved to further withstand wind stress when the vehicle 17 is in motion.

In use, shield 10 helps prevent rain or snow from entering the window opening 22 when the window 24 is in a down condition, and the rain channel 14 provides run-off of rain. The edge of the window 24 engages with the mounting member 18 when window 24 is closed, and causes no interference against full closing off of the window opening 22, so as to not affect the heating or cooling of the interior of the vehicle 17.

It will be further recognized that shield 10 may be easily removed from the vehicle 17 when it isn't needed.

In operative use the device 10 is excellent for persons who deliver mail, news papers or other items by leaning out from an automobile window 24 to place such items in a mail box etcetera. Device permits the user to see through it so as to not interfere with the operation of the vehicle 17 while at the same time affording a great deal of protection from the elements when such deliveries are being made. It should be obvious that the device can be fabricated for either a left or right side of a vehicle.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An optically transparent weather window shield for vehicles which is made of sheet-form clear plastic material and comprises:

a substantially planar main body having front and rear ends and opposite inner and outer edge portions extending between said front and rear ends;

a gutter extending along said outer edge portion between said front and rear ends;

a forward portion also having front and rear ends and opposite inner and outer edge portions extending between said front and rear ends of the forward portion with a rear end thereof integrally attached to a said front end of the main body so that the forward portion will extend forwardly at an angle from said front end of the main body so as to be inclined downwardly towards a front of said vehicle when said weather window shield is installed in said vehicle;

a flange-like mounting member having an outer face with upper and lower free edge portions and being integrally attached at a medial location along said inner edge portions of said main body and said forward portion to extend therealong with said upper and lower free edge portions extending transversely therefrom;

the window shield being resilient whereby the upper edge portion of the mounting member can be force-fitted into a window frame thereby to mount the window shield in the window frame when the window is in open condition so that the main body is horizontal and a top edge of said window will be prevented from entering the window receiving channel when the window is raised to a partially closed condition by abutment with the lower free edge of said mounting member.

2. An optically transparent weather window shield as set forth in claim 1, wherein said front end of the forward portion protrudes forwardly and below a front end of the mounting member.

* * * * *